United States Patent
Xie et al.

(10) Patent No.: US 11,005,546 B2
(45) Date of Patent: May 11, 2021

(54) ANTENNA SYSTEM, SIGNAL PROCESSING SYSTEM, AND SIGNAL PROCESSING METHOD

(71) Applicant: HUAWEI TECHNOLOGIES CO., LTD., Guangdong (CN)

(72) Inventors: Qingming Xie, Shanghai (CN); Jianping Zhao, Shanghai (CN); Yang Geng, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/584,500

(22) Filed: Sep. 26, 2019

(65) Prior Publication Data

US 2020/0021346 A1  Jan. 16, 2020

Related U.S. Application Data

(63) Continuation of application No. PCT/CN2018/079272, filed on Mar. 16, 2018.

(30) Foreign Application Priority Data

Mar. 27, 2017 (CN) .......................... 201710188214.X

(51) Int. Cl.
*H04B 7/06* (2006.01)
*H01Q 3/36* (2006.01)
(Continued)

(52) U.S. Cl.
CPC ............. *H04B 7/0617* (2013.01); *H01Q 3/36* (2013.01); *H04W 16/28* (2013.01); *H04W 72/0453* (2013.01); *H04W 72/085* (2013.01)

(58) Field of Classification Search
CPC ....... H04B 7/0617; H01Q 3/36; H04W 16/28; H04W 72/0453; H04W 72/085
See application file for complete search history.

(56) References Cited

U.S. PATENT DOCUMENTS

| | | | | |
|---|---|---|---|---|
| 4,799,065 A | * | 1/1989 | Thompson | H01Q 3/2658 342/372 |
| 8,577,308 B2 | * | 11/2013 | Choi | H04B 7/0617 455/101 |

(Continued)

FOREIGN PATENT DOCUMENTS

| | | |
|---|---|---|
| CN | 101483273 A | 7/2009 |
| CN | 103414482 A | 11/2013 |

(Continued)

*Primary Examiner* — Nguyen T Vo
(74) *Attorney, Agent, or Firm* — Womble Bond Dickinson (US) LLP

(57) ABSTRACT

An antenna system is disclosed. The system includes: N radio frequency channels, configured to send a radio frequency signal to drive one or two columns of M columns of antennas, and N<M≤2N; the M columns of antennas, configured to receive radio frequency signals, where only one column of two columns of antennas driven on a same radio frequency channel are connected to one of the M−N phase shifters, and is also connected to one of the M−N power splitters; the M−N power splitters, where any of the M−N power splitters is configured to split power for the two columns of antennas connected to the radio frequency channel; and the M−N phase shifters, where any of the M−N phase shifters is configured to adjust a phase of a radio frequency signal received by an antenna connected to the phase shifter.

8 Claims, 7 Drawing Sheets

(51) Int. Cl.
*H04W 16/28* (2009.01)
*H04W 72/04* (2009.01)
*H04W 72/08* (2009.01)

(56) References Cited

U.S. PATENT DOCUMENTS

| | | |
|---|---|---|
| 9,520,637 B2 | 12/2016 | Monte et al. |
| 2006/0208944 A1 | 9/2006 | Haskell |
| 2007/0182654 A1* | 8/2007 | Rao .................. H01Q 19/12 343/779 |
| 2015/0009069 A1* | 1/2015 | Yun ................ H04B 7/18515 342/368 |
| 2015/0249291 A1 | 9/2015 | Schmidt et al. |
| 2016/0013563 A1 | 1/2016 | Timofeev et al. |
| 2016/0308279 A1 | 10/2016 | Athley et al. |
| 2017/0062950 A1 | 3/2017 | Wang et al. |

FOREIGN PATENT DOCUMENTS

| | | |
|---|---|---|
| CN | 103493289 A | 1/2014 |
| CN | 105098383 A | 11/2015 |
| CN | 106160809 A | 11/2016 |
| CN | 106329124 A | 1/2017 |
| CN | 106341173 A | 1/2017 |
| CN | 107196684 A | 9/2017 |
| EP | 1622219 A1 | 2/2006 |
| EP | 1642357 A1 | 4/2006 |
| JP | 2013520892 A | 6/2013 |
| JP | 2013531434 A | 8/2013 |
| WO | 2015082000 A1 | 6/2015 |
| WO | 2015172667 A1 | 11/2015 |

* cited by examiner

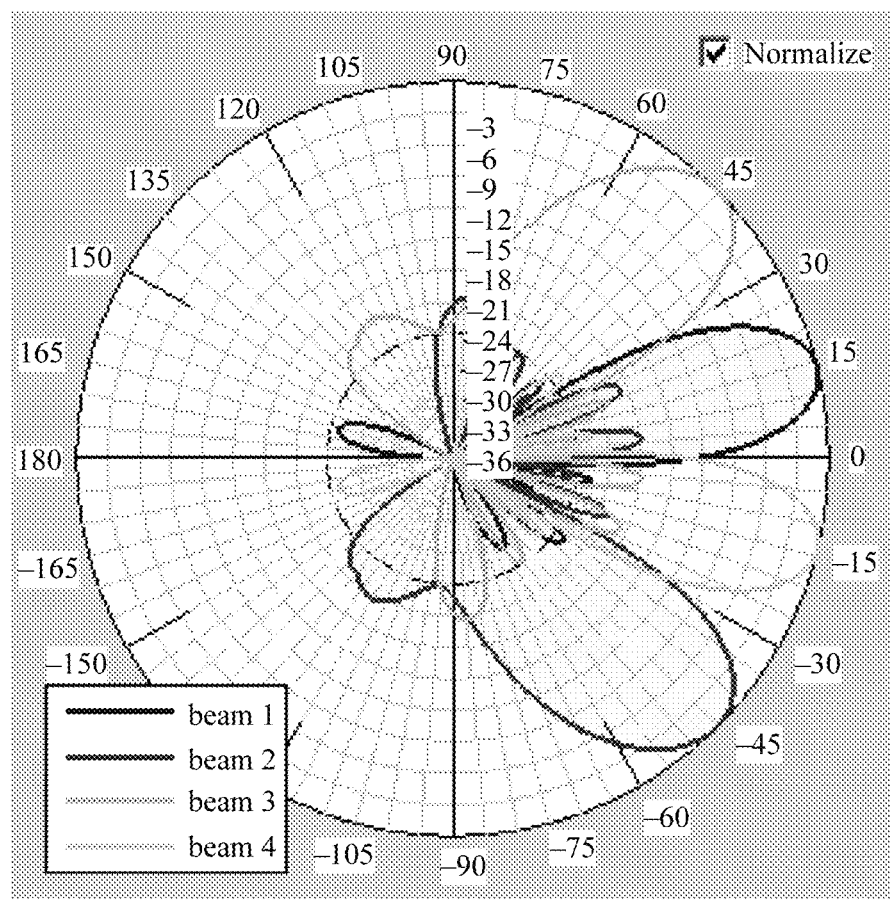
FIG. 3.1

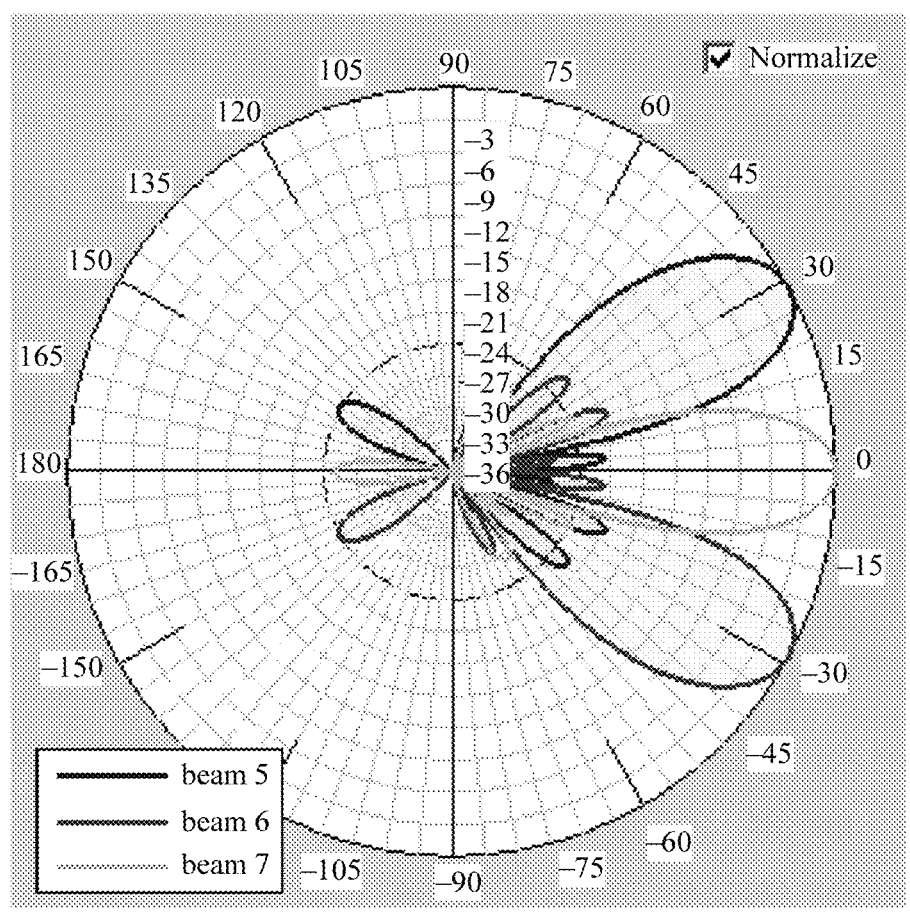
FIG. 3.2

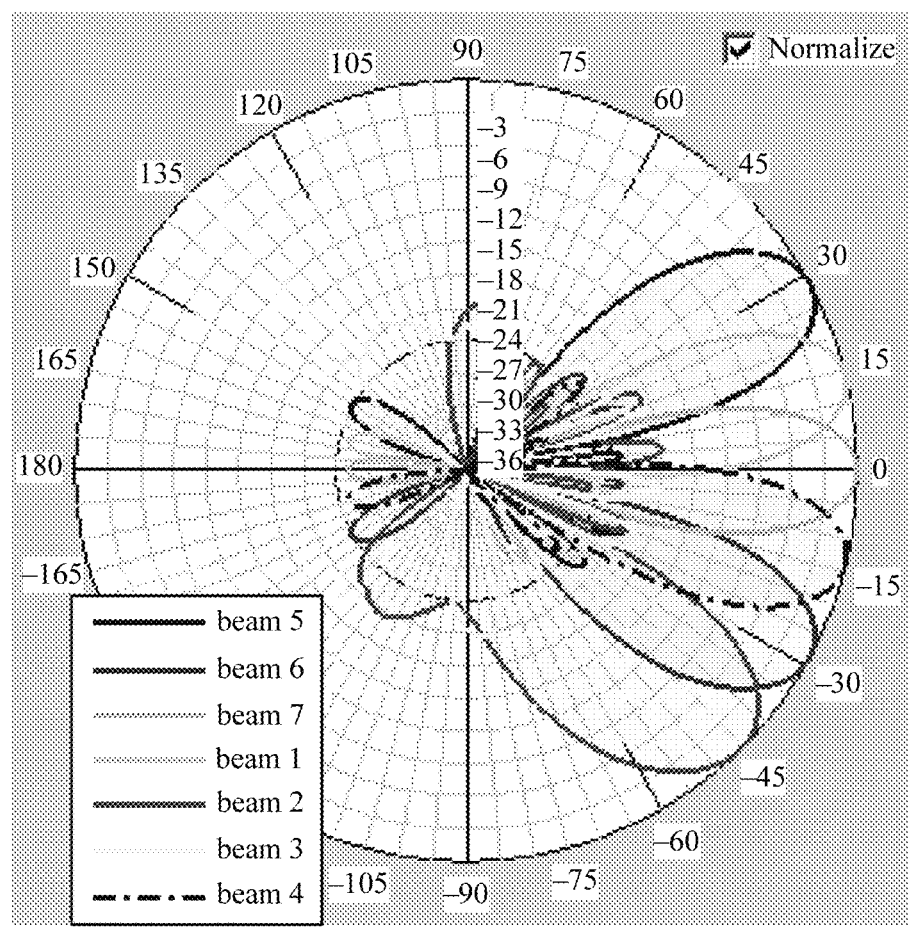
FIG. 3.3

ANTENNA SYSTEM, SIGNAL PROCESSING SYSTEM, AND SIGNAL PROCESSING METHOD

CROSS-REFERENCE TO RELATED APPLICATIONS

This application is a continuation of International Application No. PCT/CN2018/079272, filed on Mar. 16, 2018, which claims priority to Chinese Patent Application No. 201710188214.X, filed on Mar. 27, 2017. The disclosures of the aforementioned applications are hereby incorporated by reference in their entireties.

TECHNICAL FIELD

The present disclosure relates to the communications field, and in particular, to an antenna system, a signal processing system, and a signal processing method.

BACKGROUND

To meet increasingly high capacity requirements of mobile communications systems, in a current mobile communications system, a multi-column and small-spacing antenna array may be used to form a beam having a relatively high gain and a narrow beam width, to align a user, thereby enhancing a signal received by the user, to increase a capacity.

A small-spacing antenna array used in an existing antenna system usually includes four dual-polarized antennas. Antenna beamforming means that four columns of co-polarized antennas perform coherent superposition in a direction, thereby forming a directional beam. However, same power of four radio frequency channels causes amplitude of the four columns of antennas to be the same. Therefore, the formed directional beam has a relatively high side lobe. The relatively high side lobe interferes with a user in another direction, and the relatively high side lobe also causes a waste of energy. In a digital beamforming system, to implement relatively good side lobe suppression of a beam, usually antenna amplitude is enabled to be in tapered distribution. However, this causes lower power utilization of the system. Therefore, a plurality of beams may further be formed by using a multi-beamforming network including several bridges and power splitters, to implement relatively good side lobe suppression, and implement relatively high power utilization.

However, in a multi-beamforming network system including the bridges and the power splitters, directions of the beams cannot be adjusted after the beams are formed, and the directions of the beams can only be fixed. Therefore, a weak signal coverage area exists between the beams. Consequently, when a terminal device appears in the weak signal coverage area, a signal received by the terminal device is relatively weak or even no signal is received by the terminal device.

SUMMARY

Embodiments of the present disclosure provide a signal processing method and system and an antenna system, to adjust a received radio frequency signal while high power and a low side lobe are ensured, so that an antenna array forms a required beam.

In view of this, a first aspect of the present disclosure provides an antenna system. The system includes:

N radio frequency channels, M columns of antennas, M−N power splitters, and M−N phase shifters, where N is an even number, N<M≤2N, the M columns of antennas are sequentially sorted from 1 to M and form an antenna array, and two neighboring columns of antennas have neighboring sequence numbers; and any of the N radio frequency channels is configured to send a radio frequency signal to drive one or two columns of the M columns of antennas.

In this embodiment of the present disclosure, the relatively small quantity (N) of radio frequency channels are used to drive the relatively large quantity (M) of antennas. Specifically, one to two columns of antennas are driven on one radio frequency channel. Antennas driven on a same radio frequency channel are referred to as an antenna group. The M columns of antennas 103 may form N antenna groups, and each antenna group includes one or two columns of antennas.

The M columns of antennas are configured to receive radio frequency signals from the N radio frequency channels and form a target beam, and only one column of two columns of antennas driven on a same radio frequency channel are connected to one of the M−N phase shifters, and is also connected to one of the M−N power splitters; any of the M−N power splitters is configured to split power for the two columns of antennas connected to the radio frequency channel; and any of the M−N phase shifters is configured to adjust a phase of a radio frequency signal received by an antenna connected to the phase shifter.

In this embodiment of the present disclosure, the M columns of antennas 103 are connected to N radio frequency channels 101 by using a signal processing system 102. The signal processing system 102 may include the M−N power splitters and the M−N phase shifters. Power split for the M columns of antennas is adjusted by using the M−N power splitters, and phases of radio frequency signals received by the M columns of antennas 103 are adjusted by using the M−N phase shifters, thereby adjusting a beam mode of the antennas, so that a beam having a low side lobe is formed while power is high, and a direction and a beam width of the beam may be adjusted to overcome a prior-art problem of weak coverage due to a nonadjustable beam.

Connection modes of the M columns of antennas and the M−N phase shifters include:

if M is an even number, in the M columns of antennas, an $(M/2-N/2+1)^{th}$ to an $(M/2+N/2)^{th}$ columns of antennas are not connected to a phase shifter, and remaining M−N columns of antennas are connected to the M−N phase shifters; and if M is an odd number, in the M columns of antennas, N columns of antennas that have consecutive sequence numbers and that are in a second to an $M^{th}$ columns of antennas are not connected to a phase shifter, and remaining M−N columns of antennas are respectively connected to the M−N phase shifters, or N columns of antennas that have consecutive sequence numbers and that are in a first to an $(M-1)^{th}$ columns of antennas are not connected to a phase shifter, and remaining M−N columns of antennas are respectively connected to the M−N phase shifters.

In one embodiment, the phase shifter is a 1-bit phase shifter, and the 1-bit phase shifter is configured to adjust the phase of the radio frequency signal received by the antenna connected to the phase shifter to 0 degrees or 180 degrees.

In this embodiment of the present disclosure, if antennas connected to no phase shifter are not neighboring to each other, if the phase shifter is the 1-bit phase shifter for switching of 0 degrees/180 degrees, a phase difference of neighboring antennas is inevitably caused to be 180 degrees during switching. This inevitably causes a generated beam not to be a relatively good beam.

With reference to the first aspect of the present disclosure, a first implementation of the first aspect of the present disclosure includes:

a value of N is 4, a value of M is 8, and a connection mode of the four radio frequency channels, the eight columns of antennas, the four power splitters, and the four phase shifters is:

antennas having sequence numbers of 1 and 5, 2 and 6, 3 and 7, and 4 and 8 are respectively driven on radio frequency channels having sequence numbers of 1, 2, 3, and 4, and two columns of antennas driven on each radio frequency channel are connected by using one power splitter, where a first, second, seventh, and eighth columns of antennas are connected to the phase shifters.

In one embodiment, an antenna spacing between the four antenna groups is 0.5λ, a power split ratio of output of two of the four power splitters is 3:7, and a power split ratio of output of the other two power splitters is 1:4.

In one embodiment, the antenna is a dual-polarized antenna, and the dual-polarized antenna includes an antenna element polarized at +45 degrees and an antenna element polarized at −45 degrees.

A second aspect of the present disclosure provides a signal processing system. The system includes:

the M−N power splitters and the M−N phase shifters in the first aspect of the present disclosure and the first implementation of the first aspect of the present disclosure.

A third aspect of the present disclosure provides a signal processing method. The method includes:

splitting power for each column of the M columns of antennas based on the target beam when the N radio frequency channels send the radio frequency signals to the M columns of antennas; and adjusting, based on the target beam, a phase of a radio frequency signal received by each column of the M columns of antennas, so that the M columns of antennas form the target beam.

A fourth aspect of the present disclosure provides a computer-readable storage medium. The computer-readable storage medium stores an instruction. When the instruction is run on a computer, the computer is enabled to perform the method according to the foregoing aspects.

A fifth aspect of the present disclosure provides a computer program product including an instruction. When the computer program product is run on a computer, the computer is enabled to perform the method according to the foregoing aspects.

It can be learned from the foregoing technical solutions, the embodiments of the present disclosure have the following advantages:

In the antenna system including the N radio frequency channels, the M columns of antennas, the M−N power splitters, and the M−N phase shifters (where N is an even number, and N<M≤2N), the M columns of antennas are driven on the N radio frequency channels, so that the M columns of antennas form the target beam, and for the two columns of antennas driven on the same radio frequency channel, only one column of antennas are connected to one of the M−N phase shifters that is configured to adjust the phase of the radio frequency signal received by the antenna connected to the phase shifter, and is also connected to one of the M−N power splitters that is configured to split power for the two columns of antennas connected to the radio frequency channel, so that a size and a direction of a beam can be dynamically adjusted while power of a radio frequency channel is high and the beam having a low side lobe is formed, and a cell or a sector that is served does not have a weak coverage area.

BRIEF DESCRIPTION OF DRAWINGS

FIG. 3.1 is a schematic diagram of a beam formed in an antenna system according to an embodiment of the present disclosure;

FIG. 3.2 is a schematic diagram of another beam formed in an antenna system according to an embodiment of the present disclosure;

FIG. 3.3 is a schematic diagram of another beam formed in an antenna system according to an embodiment of the present disclosure;

DESCRIPTION OF EMBODIMENTS

Embodiments of the present disclosure provide an antenna system, a signal processing system, and a signal processing method, to adjust a received radio frequency signal while high power and a low side lobe are ensured, so that an antenna array forms a required beam.

To make the technical solutions in the embodiments of the present disclosure more comprehensible for persons skilled in the art, the following clearly describes the technical solutions in the embodiments of the present disclosure with reference to the accompanying drawings in the embodiments of the present disclosure. Apparently, the described embodiments are merely some but not all of the embodiments of the present disclosure.

In the specification, claims, and accompanying drawings of the present disclosure, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments described herein can be implemented in other orders than the order illustrated or described herein. In addition, the terms "include", "contain" and any other variants mean to cover the non-exclusive inclusion. For example, a process, method, system, product, or device that includes a series of operations or units is not necessarily limited to those expressly listed operations or units, but may include another operation or unit not expressly listed or inherent to such a process, method, product, or device.

In the embodiments of the present disclosure, a multi-column and small-spacing antenna array may be used for a mobile communications system to form a beam having a narrow beam width, to align a user, thereby enhancing a signal received by the user. However, the beam formed in such a way has a relatively high side lobe, which interferes with a user in another direction, and also causes a waste of energy. To implement relatively good side lobe suppression of a beam, a plurality of beams may be formed by using a multi-beamforming network including several bridges and power splitters. Several antenna array ports obtain several beam ports through the beamforming network, implement the relatively good side lobe suppression, and implement relatively high power utilization. However, because directions of the formed beams cannot be adjusted, a weak signal coverage area exists between the beams.

Therefore, an embodiment of the present disclosure provides an antenna system, so that a size and a direction of a beam can be dynamically adjusted while power of a radio frequency channel is high and the beam having a low side lobe is formed, and a cell or a sector that is served does not have a weak coverage area.

Figure 1:
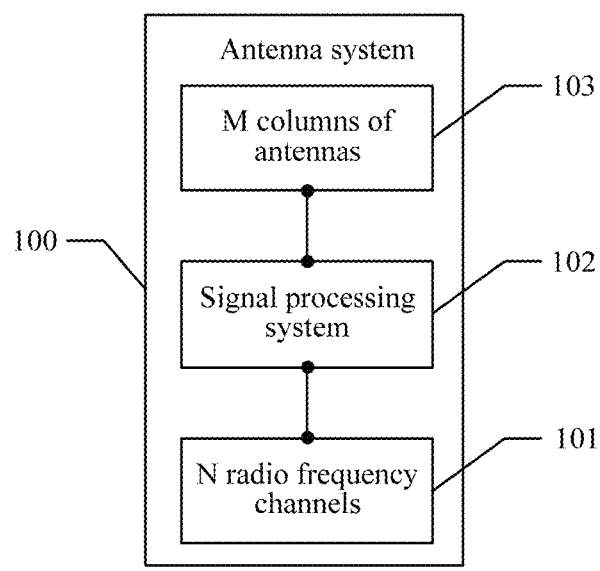
FIG. 1 is a schematic diagram of an embodiment of an antenna system according to an embodiment of the present disclosure.

For ease of understanding, the following describes the antenna system in this embodiment of the present disclosure. FIG. 1 shows an antenna system 100. The antenna system 100 includes:

N radio frequency channels 101, a signal processing system 102, and M columns of antennas 103 (where N is an even number, and N<M≤2N), where the M columns of antennas are sequentially sorted from 1 to M and form an antenna array, two neighboring columns of antennas have neighboring sequence numbers, the N radio frequency channels 101 are configured to send radio frequency signals to the M columns of antennas 103, the signal processing system 102 is configured to receive the radio frequency signals, and process the radio frequency signals based on a target beam, and the M columns of antennas 103 are configured to form the target beam based on the radio frequency signals processed by the signal processing system.

In this embodiment of the present disclosure, the antenna is a converter, and converts a pilot wave propagated on a transmission line into an electromagnetic wave propagated in an unbound medium (which is usually free space), or converts inversely. It should be noted that directivity of one column of antennas is limited. To be suitable for applications in various scenarios, battery feeding and spatial arrangement are performed, based on a requirement, on a plurality of columns of antennas working at a same frequency, to form an antenna array. The M columns of antennas are an antenna array. In the antenna array including the M columns of antennas, each column of the M columns of antennas has a sequence number from 1 to M. Two columns of antennas having neighboring sequence numbers have neighboring physical locations in the antenna array. For example, antennas having sequence numbers of 4 and 5 are neighboring.

In this embodiment of the present disclosure, the relatively small quantity (N) of radio frequency channels are used to drive the relatively large quantity (M) of antennas. Specifically, one to two columns of antennas are driven on one radio frequency channel. Antennas driven on a same radio frequency channel are referred to as an antenna group. The M columns of antennas 101 may form N antenna groups, and each antenna group includes one or two columns of antennas.

It should be noted that because the M columns of antennas form N antenna groups, and each antenna group includes one to two columns of antennas, it is apparent that M is greater than N and is less than or equal to 2N. For example, an antenna array has eight columns of antennas, sequence numbers of the eight columns of antennas are respectively 1, 2, 3, . . . , 7, and 8, antennas connected to no phase shifter have sequence numbers of 2, 3, 4, and 5, and antennas connected to a phase shifter have sequence numbers of 1, 6, 7, and 8. One column of the columns of antennas having the sequence numbers of 2, 3, 4, and 5 and one column of the columns of antennas having the sequence numbers of 1, 6, 7, and 8 may form one antenna group.

One column of antennas having a sequence number from 1 to 4 and one column of antennas having a sequence number from 5 to 8 form an antenna group. If M is an odd number, such as 7, the column of antennas having the sequence number of 4 may separately form an antenna group.

It should be noted that if N is an odd number, both the phase shifter and a power splitter cannot find a weighted value corresponding to the radio frequency channel, forming a narrow beam that has a particular direction and a low secondary lobe. Therefore, in this embodiment of the present disclosure, N needs to be an even number.

In this embodiment of the present disclosure, the M columns of antennas 103 are connected to the N radio frequency channels 101 by using the signal processing system 102. The signal processing system 102 may include M−N power splitters and M−N phase shifters. Power split for the M columns of antennas is adjusted by using the M−N power splitters, and phases of radio frequency signals received by the M columns of antennas 103 are adjusted by using the M−N phase shifters, thereby adjusting a beam mode of the antennas, so that a beam having a low side lobe is formed while power is high, and a direction and a beam width of the beam may be adjusted to overcome a prior-art problem of weak coverage due to a nonadjustable beam.

A general framework of the antenna system 100 in this embodiment of the present disclosure is described above. The following describes the signal processing system 102 in the antenna system 100 in this embodiment of the present disclosure and a connection relationship between components in the antenna system 100 in detail.

Figure 2:
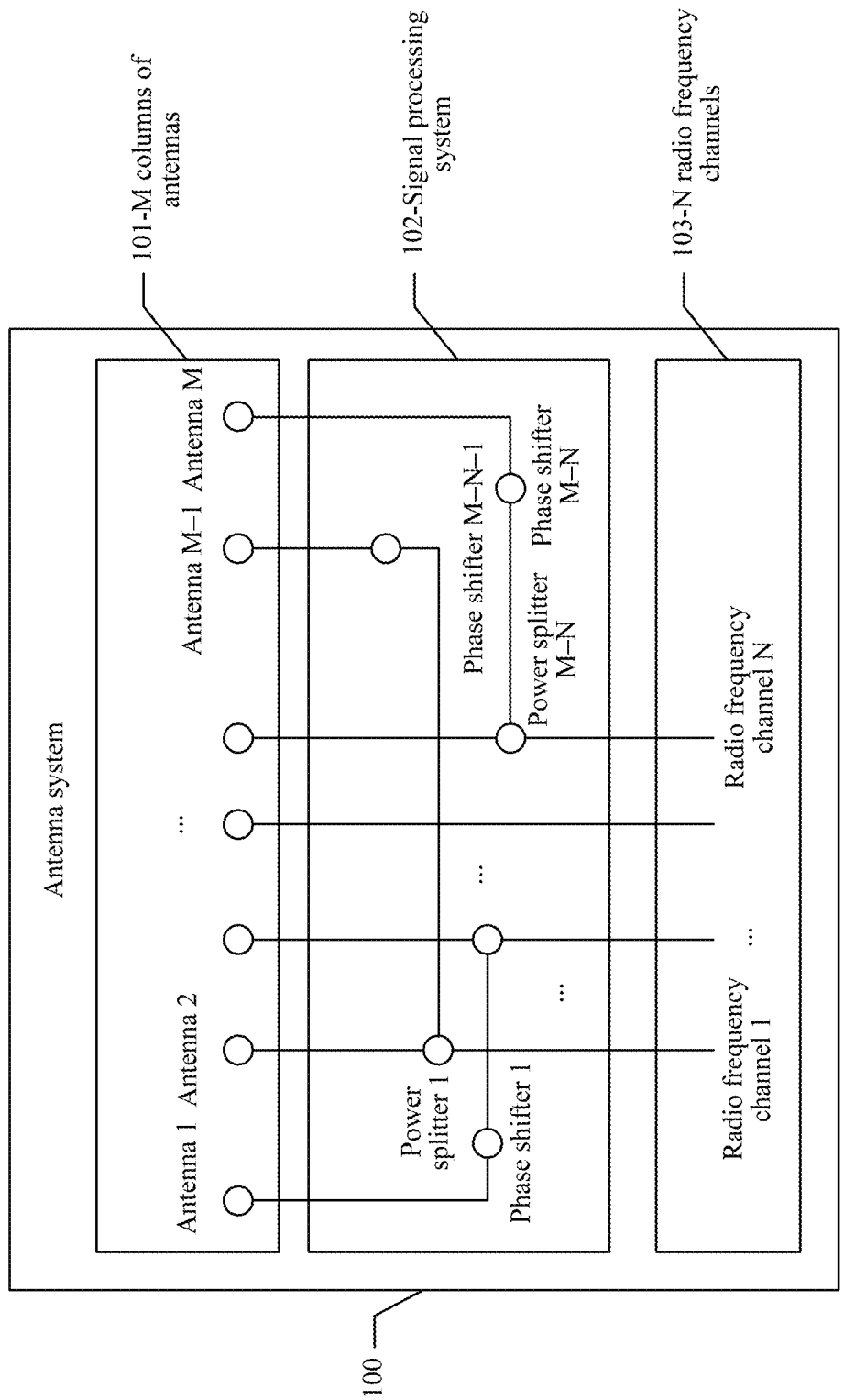
FIG. 2 is a schematic diagram of another embodiment of an antenna system according to an embodiment of the present disclosure.

As shown in FIG. 2, the antenna system 100 includes the N radio frequency channels 101, the M columns of antennas 103, and the signal processing system 102. The signal processing system 102 includes the M–N power splitters and M–N phase shifters (where N is an even number, and N<M≤2N).

In the M columns of antennas, for two columns of antennas driven on a same radio frequency channel, only one column of antennas is connected to one of the M–N phase shifters, and is also connected to one of the M–N power splitters. The phase shifter is configured to adjust a phase of a radio frequency signal received by an antenna connected to the phase shifter. The power splitter is configured to split power for the two columns of antennas connected to the radio frequency channel.

In some feasible embodiments, a power splitter is a device for dividing a single path of input signal energy into two or more paths of equal or unequal output energy, or combining a plurality of paths of signal energy into a single path of output energy. The power splitter is usually divided into a one-to-two (one input and two outputs) power splitter, a one-to-three (one input and three outputs) power splitter, or the like based on output.

When the power splitter receives a radio frequency signal sent through a radio frequency channel, the power splitter may split power for two columns of antennas, so that when an antenna array receives the radio frequency signal, a required beam is formed, power of the radio frequency channel does not need to be reduced, and highest power utilization is ensured. It should be noted that when an antenna group is one column of antennas, the power splitter is not needed.

It should be noted that a power refers to work done by an object in unit time. That is, the power is a physical quantity for describing a speed of doing work. In this embodiment of the present disclosure, a method for calculating power utilization is a transmit power/a total radio frequency power capability.

In this embodiment of the present disclosure, any of the M–N phase shifters is connected to one column of antennas in an antenna group that includes two columns of antennas and that is in the N antenna groups, and is configured to adjust, based on the target beam, the phase of the radio frequency signal received by the antenna connected to the phase shifter.

The phase shifter is an apparatus that can adjust a phase of a radio frequency signal. The phase shifter is widely used in fields of radar, missile attitude control, accelerators, communications, instrument, even music, and the like. The phase shifter may be connected between an antenna array and a radio frequency channel, and is configured to adjust, based on a target beam, a phase of a received radio frequency signal. The phase shifter may be a high-precision phase shifter, or may be a low-precision phase shifter. This is not limited herein. In this embodiment of the present disclosure, beneficial effects can be achieved by using the high-precision phase shifter or the low-precision phase shifter. Therefore, in consideration of reducing costs, use of the low-precision phase shifter may be prioritized.

It should be noted that a target direction of a target beam formed by an antenna is adjusted by adjusting a phase of a radio frequency signal. A target phase may be determined based on the target direction. A phase shifter may be adjusted to the target phase, a direction of a beam may be determined based on the target direction, and a required target phase may be determined based on the direction of the beam.

It should be noted that phases of an electromagnetic wave include three parts: a time phase, a space phase, and an initial phase. For the initial phase, after a transmit channel and an operating frequency are determined, the initial phase of the electromagnetic wave is determined. At a moment at which several columns of electromagnetic waves encounter, time phases are also determined, and only space phases may change. Locations of antennas in units that form an antenna array are different, and space paths through which electromagnetic waves sent by the antennas in the units are transmitted to a same receiving area are different. In this way, values of the space phases are caused to be different. Therefore, an adjusted target phase is actually a value of a space phase.

In some feasible embodiments, a target beam includes a target direction that is a direction of one terminal or several close terminals. A formed beam may be used for alignment. The beam may be a narrow beam, to be specific, a beam having a relatively small beam width and a relatively large gain. In some other feasible embodiments, a relatively wide beam may alternatively be formed. This is not limited herein. It should be noted that a beam refers to a shape formed by an electromagnetic wave transmitted from an antenna array on a surface of the earth.

In this embodiment of the present disclosure, a target direction may be a preset direction; or may be determined based on a served terminal, for example, the target direction always align the served terminal and moves with the terminal; or may point to a particular direction within a particular time according to the protocol, for example, in a fixed time period, align a served target and point to the target once or several times. There may further be another method for setting the target direction. This is not limited herein.

In some feasible embodiments, a signal processing system may further include another passive component, to form a passive network. This is not limited herein.

In this embodiment of the present disclosure, connection modes of the M columns of antennas and the M–N phase shifters are:

if M is an even number, in the M columns of antennas, an $(M/2-N/2+1)^{th}$ to an $(M/2+N/2)^{th}$ columns of antennas are not connected to a phase shifter, and remaining M–N columns of antennas are connected to the M–N phase shifters; and if M is an odd number, in the M columns of antennas, N columns of antennas that have consecutive sequence numbers and that are in a second to an $M^{th}$ columns of antennas are not connected to a phase shifter, and remaining M–N columns of antennas are respectively connected to the M–N phase shifters, or N columns of antennas that have consecutive sequence numbers and that are in a first to an $(M-1)^{th}$ columns of antennas are not connected to a phase shifter, and remaining M−N columns of antennas are respectively connected to the M−N phase shifters.

In this embodiment of the present disclosure, if antennas connected to no phase shifter are not neighboring to each other, if the phase shifter is a 1-bit phase shifter for switching of 0 degrees/180 degrees, a phase difference of neighboring antennas is inevitably caused to be 180 degrees during switching. This inevitably causes a generated beam not to be a relatively good beam.

It should be noted that a main factor that affects a 3 dB beam width and a side lobe of a beam is excitation amplitude of columns of an antenna array, and a main factor that affects a direction of the beam is excitation phases of the columns of the antenna array. To obtain a narrow beam having a particular direction and a low side lobe, that phases of antennas form an arithmetic progression and amplitude is in tapered distribution needs to be satisfied. A difference of the arithmetic progression is $\Delta\varphi = d \cdot \sin\theta$, where usually $\theta$ is less than 150 degrees, d is a column spacing in the array, and $\theta$ is the direction of the beam. As described above, if the phase difference of the neighboring antennas is 180 degrees, a narrow beam having a particular direction and a low side lobe cannot be formed.

In one embodiment, an antenna in the M columns of antennas is a dual-polarized antenna. The dual-polarized antenna is an antenna element polarized at +45 degrees and an antenna element polarized at −45 degrees.

It should be noted that a dual-polarized antenna is an antenna technology that combines antennas that are orthogonal to each other in polarization directions of +45 degrees and −45 degrees and that simultaneously work in duplex mode. Usually six antennas need to be used for a directional base station (three sectors) of a digital mobile communications network. Two antennas (space diversity, 1T2R) are used for each sector. If the dual-polarized antenna is used, only one antenna is needed for each sector. In addition, because of the dual-polarized antenna, ±45-degree polarization orthogonality can ensure that isolation between two antennas of +45 degrees and −45 degrees meets a requirement of intermodulation for antenna isolation. In addition, the dual-polarized antenna has advantages of a remote electrical tilt antenna. In the mobile communications network, using the dual-polarized antenna, like the remote electrical tilt antenna, can reduce call loss, reduce interference, and improve service quality of an entire network.

Figure 3:
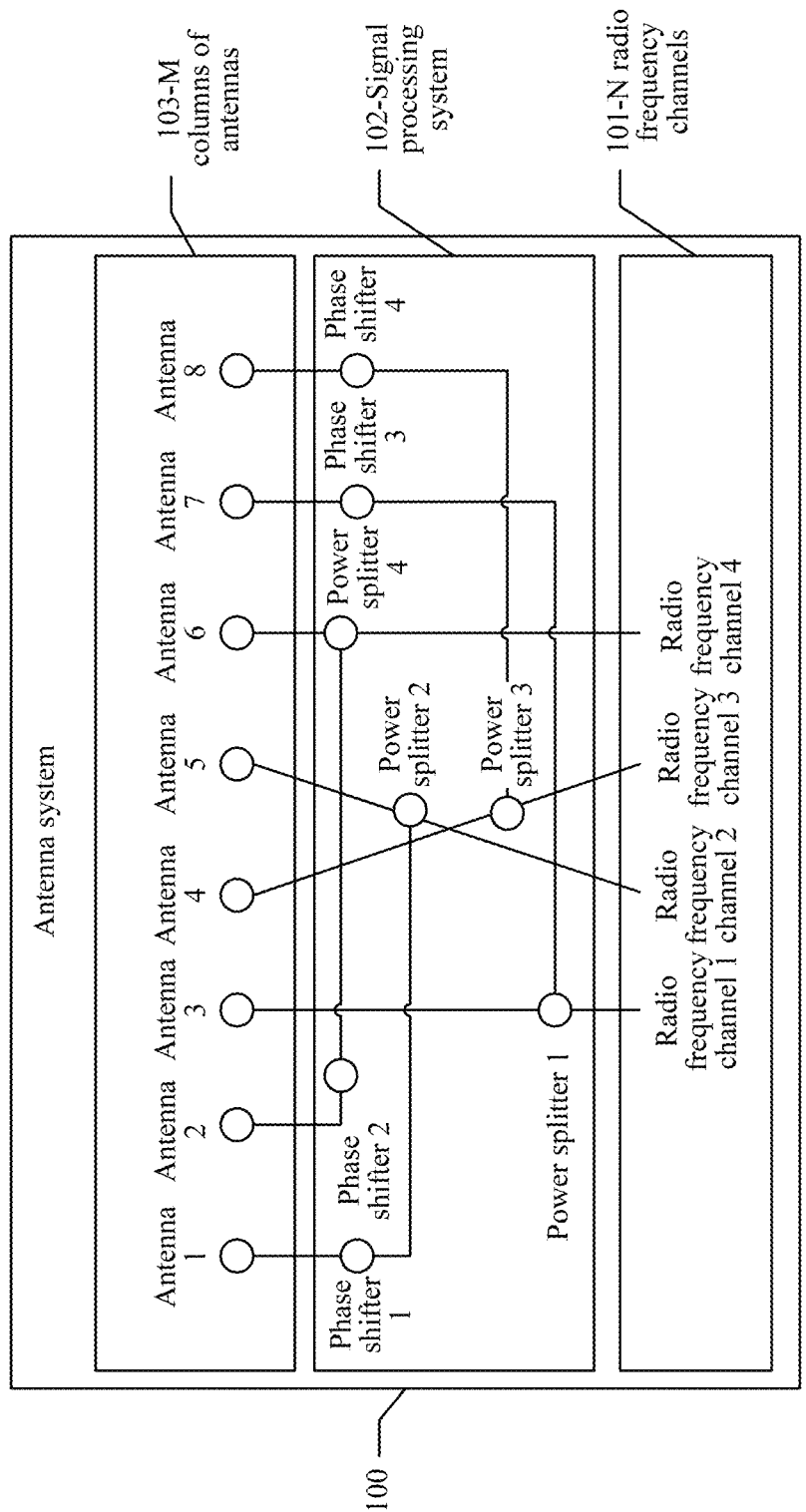
FIG. 3 is a schematic diagram of another embodiment of an antenna system according to an embodiment of the present disclosure.

As shown in FIG. 3, that a value of N is 4, a value of M is 8, and a connection mode of four radio frequency channels, eight columns of antennas, four power splitters, and four phase shifters is: antennas having sequence numbers of 1 and 5, 2 and 6, 3 and 7, and 4 and 8 are respectively driven on radio frequency channels having sequence numbers of 1, 2, 3, and 4, and two columns of antennas driven on each radio frequency channel are connected by using one power splitter, where that a first, second, seventh, and eighth columns of antennas are connected to the phase shifters is used as an example.

An antenna spacing between the four antenna groups is 0.5λ, where λ is a wavelength. A power split ratio of output of two of the four power splitters is 3:7, and a power split ratio of output of the other two power splitters is 1:4. An antenna in the M columns of antennas is a dual-polarized antenna. The dual-polarized antenna is an antenna element polarized at +45 degrees and an antenna element polarized at −45 degrees.

An antenna beam mode 1 is (a weighted value table of the radio frequency channels).

Power of the four transceiver channels is consistent, and power utilization is 100%. Beam forms shown in the following chart may be formed:

| Beam/Radio frequency channel | Radio frequency channel 1 Power/phase | Radio frequency channel 2 Power/phase | Radio frequency channel 3 Power/phase | Radio frequency channel 4 Power/phase |
| --- | --- | --- | --- | --- |
| Beam 1 | 1/∠−45 | 1/∠−90 | 1/∠−135 | 1/∠−180 |
| Beam 2 | 1/∠−135 | 1/∠0 | 1/∠−225 | 1/∠−90 |
| Beam 3 | 1/∠−90 | 1/∠−225 | 1/∠0 | 1/∠−135 |
| Beam 4 | 1/∠−180 | 1/∠−135 | 1/∠−90 | 1/∠−45 |

Based on power split performed by the power splitter on the two columns of antennas connected to the radio frequency channel, the following antenna weighted value table is obtained: (an antenna weighted value table)

| | Antenna 1 | Antenna 2 | Antenna 3 | Antenna 4 | Antenna 5 | Antenna 6 | Antenna 7 | Antenna 8 |
| --- | --- | --- | --- | --- | --- | --- | --- | --- |
| Beam 1 | 0.4∠45 | 0.54∠0 | 0.84∠−45 | 0.9∠−90 | 0.9∠−135 | 0.84∠−180 | 0.54∠−225 | 0.4∠−270 |
| Beam 2 | 0.4∠−45 | 0.54∠90 | 0.84∠−135 | 0.9∠0 | 0.9∠−225 | 0.84∠−90 | 0.54∠45 | 0.4∠180 |
| Beam 3 | 0.4∠−180 | 0.54∠45 | 0.84∠−90 | 0.9∠−225 | 0.9∠0 | 0.84∠−135 | 0.54∠−270 | 0.4∠45 |
| Beam 4 | 0.4∠−270 | 0.54∠−225 | 0.84∠−180 | 0.9∠−135 | 0.9∠−90 | 0.84∠−45 | 0.54∠0 | 0.4∠45 |

It should be noted that all the foregoing beams are narrow beams, amplitude in tapered distribution (high in the middle and low on two sides) is beneficial to side lobe suppression, and phases in equidifferent distribution are to form beams having different directions.

Referring to FIG. 3.1, the following parameter values may be obtained for each beam:

| Beam | Direction | Side lobe level | Beam width |
| --- | --- | --- | --- |
| Beam 1 | 14 degrees | −22.5 | 15.1 |
| Beam 2 | −46 degrees | −20 | 20.6 |
| Beam 3 | 46 degrees | −20 | 20.54 |
| Beam 4 | −14 degrees | −22.5 | 15.1 |

Antenna beam mode 2: Power of the four transceiver channels is consistent, and power utilization is 100%. The following beam forms (Beam parameters) may be formed:

| Beam/Radio frequency channel | Radio frequency channel 1 Power/phase | Radio frequency channel 2 Power/phase | Radio frequency channel 3 Power/phase | Radio frequency channel 4 Power/phase |
|---|---|---|---|---|
| Beam 1 | 1/∠−45 | 1/∠−90 | 1/∠−135 | 1/∠−180 |
| Beam 2 | 1/∠−135 | 1/∠0 | 1/∠−225 | 1/∠−90 |
| Beam 3 | 1/∠−90 | 1/∠−225 | 1/∠0 | 1/∠−135 |
| Beam 4 | 1/∠−180 | 1/∠−135 | 1/∠−90 | 1/∠−45 |

Referring to FIG. 3.2, the following parameter values (TRX channel weighted value table) may be obtained for each beam:

| Beam | Direction | Side lobe level | Beam width |
|---|---|---|---|
| Beam 1 | 14 degrees | −22.5 | 15.1 |
| Beam 2 | −46 degrees | −20 | 20.6 |
| Beam 3 | 46 degrees | −20 | 20.54 |
| Beam 4 | −14 degrees | −22.5 | 15.1 |

Based on power split performed by the power splitter on the two columns of antennas connected to the radio frequency channel, the following antenna weighted value table (an antenna weighted value table) is obtained:

| | Antenna 1 | Antenna 2 | Antenna 3 | Antenna 4 | Antenna 5 | Antenna 6 | Antenna 7 | Antenna 8 |
|---|---|---|---|---|---|---|---|---|
| Beam A | 0.4∠−270 | 0.54∠−180 | 0.84∠90 | 0.9∠0 | 0.9∠−90 | 0.84∠−180 | 0.54∠90 | 0.4∠0 |
| Beam B | 0.4∠−90 | 0.54∠0 | 0.84∠−90 | 0.9∠0 | 0.9∠90 | 0.84∠180 | 0.54∠−90 | 0.4∠0 |
| Beam H | 0.4∠−180 | 0.54∠0 | 0.84∠0 | 0.9∠0 | 0.9∠0 | 0.84∠0 | 0.54∠0 | 0.4∠0 |

It should be noted that all the foregoing beams are narrow beams, amplitude in tapered distribution (high in the middle and low on two sides) is beneficial to side lobe suppression, and phases in equidifferent distribution are to form beams having different directions.

It may be learned from the foregoing tables that in the present disclosure, by adjusting the phase shifters and the power splitters, the directions of the beams can be controlled, the beam widths can also be controlled, the side lobe levels can further be controlled, and finally beams pointing to the target direction are formed while the power utilization is 100% and the side lobe suppression is relatively good. Finally, beams shown in FIG. 3.3 can be formed, implementing seamless coverage of a 120-degree sector.

It should be noted that beamforming usually has two or more lobes. A lobe has a largest radiant intensity is referred to as a main lobe. A remaining lobe is referred to as a secondary lobe or a side lobe. An included angle between two points whose radiant intensities are reduced by 3 dB (where dB is decibel, that is, power densities are reduced by half) on two sides of a largest radiation direction of the main lobe is defined as a lobe width (also referred to a beam width). A smaller lobe width indicates better directivity, a longer working distance, and stronger interference immunity. A "side lobe level" refers to a logarithm of a ratio of two powers or voltages, and sometimes may be used to indicate a logarithm of a ratio of two currents. Generally, a smaller side lobe level indicates a smaller capability waste, and it may be considered that quality of the beam is better.

Therefore, it may be learned that the antenna system can ensure that a size and a direction of a beam can be dynamically adjusted while power of a radio frequency channel is high and the beam having a low side lobe is formed, and a cell or a sector that is served does not have a weak coverage area.

In some feasible embodiments, the phase shifter may be a 1-bit phase shifter, namely, a phase shifter that adjusts, based on a target beam, a phase of a radio frequency signal received by an antenna connected to the phase shifter to 0 degrees or 180 degrees. A size and a direction of a beam can also be dynamically adjusted while power is high and the beam having a low side lobe is formed. Details are not described herein again.

The antenna system 100 in the embodiments of the present disclosure is described above. The following describes a signal processing method in the embodiments of the present disclosure.

Figure 4:
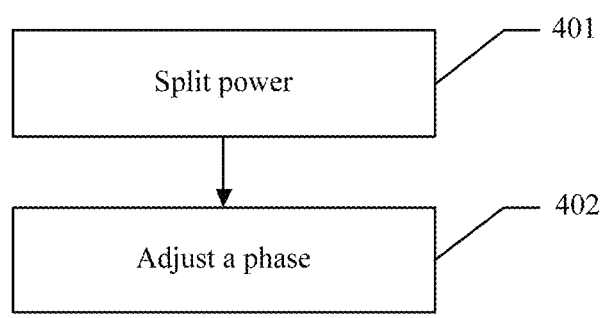
FIG. 4 is a schematic diagram of an embodiment of a signal processing method according to an embodiment of the present disclosure.

FIG. 4 shows a signal processing method, applicable to an antenna system including N radio frequency channels and M columns of antennas. The method includes:

Operation 401. When the N radio frequency channels send radio frequency signals to the M columns of antennas, a signal processing system splits power for each column of the M columns of antennas based on a target beam.

Operation 402. The signal processing system adjusts, based on the target beam, a phase of a radio frequency signal received by each column of the M columns of antennas, so that the M columns of antennas form the target beam.

Figure 5:
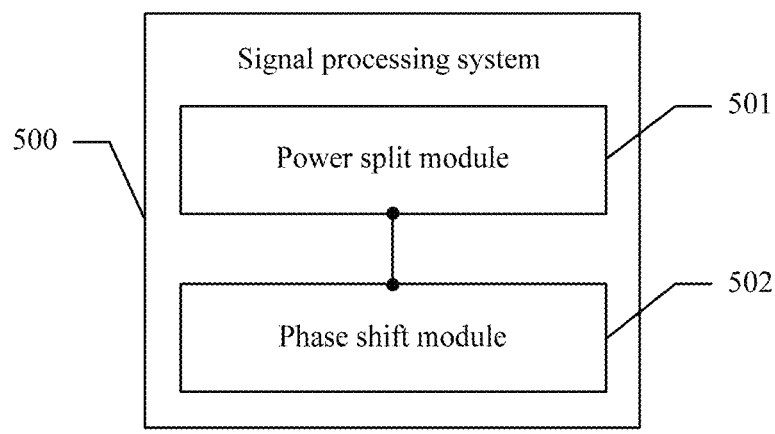
FIG. 5 is a schematic diagram of an embodiment of a signal processing system according to an embodiment of the present disclosure.

As shown in FIG. 5, the embodiments of the present disclosure further provide a signal processing system 500. The system 500 includes:

a power split module 501, configured to split, when the N radio frequency channels send radio frequency signals to the M columns of antennas, power for each column of the M columns of antennas based on a target beam; and a phase shift module 502, configured to adjust, based on the target beam, a phase of a radio frequency signal received by each column of the M columns of antennas, so that the M columns of antennas form the target beam.

An embodiment of the present disclosure provides a computer-readable storage medium, including an instruction. When the instruction is run on a computer, the computer is enabled to perform the method in operations 401 and 402.

Persons skilled in the art may clearly learn that for convenient and brief description, for operations 401 and 402 in the foregoing embodiment and a specific working process of the signal processing system 500, refer to a corresponding process in the embodiment of the antenna system. Details are not described herein again.

In the several embodiments provided in the present disclosure, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

All or some of the foregoing embodiments may be implemented by means of software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present disclosure are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

In conclusion, the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. An antenna system, comprising:
   N radio frequency channels, M columns of antennas, MN power splitters, and MN phase shifters, wherein N is an even number, N<M≤2N, the M columns of antennas are sequentially sorted from 1 to M and form an antenna array, and two neighboring columns of antennas have neighboring sequence numbers;
   any of the N radio frequency channels is configured to send a radio frequency signal to drive one or two columns of the M columns of antennas;
   the M columns of antennas are configured to receive radio frequency signals from the N radio frequency channels and form a target beam, and only one column of two columns of antennas driven on a same radio frequency channel are connected to one of the M–N phase shifters, and is also connected to one of the M–N power splitters;
   any of the M–N power splitters is configured to split power for the two columns of antennas connected to the radio frequency channel;
   any of the M–N phase shifters is configured to adjust a phase of a radio frequency signal received by an antenna connected to the phase shifter; and
   connection modes of the M columns of antennas and the M–N phase shifters comprise:
   if M is an even number, in the M columns of antennas, an $(M/2-N/2+1)^{th}$ to an $(M/2+N/2)^{th}$ columns of antennas are not connected to a phase shifter, and remaining M–N columns of antennas are connected to the M–N phase shifters; and
   if M is an odd number, in the M columns of antennas, N columns of antennas that have consecutive sequence numbers and that are in a second to an $M^{th}$ columns of antennas are not connected to a phase shifter, and remaining M–N columns of antennas are respectively connected to the M–N phase shifters, or N columns of antennas that have consecutive sequence numbers and that are in a first to an $(M-1)^{th}$ columns of antennas are not connected to a phase shifter, and remaining M–N columns of antennas are respectively connected to the M–N phase shifters.

2. The antenna system according to claim 1, wherein the phase shifter is a 1-bit phase shifter, and the 1-bit phase shifter is configured to adjust the phase of the radio frequency signal received by the antenna connected to the phase shifter to 0 degrees or 180 degrees.

3. The antenna system according to claim 2, wherein a value of N is 4, a value of M is 8, and a connection mode of the four radio frequency channels, the eight columns of antennas, the four power splitters, and the four phase shifters is:
   antennas having sequence numbers of 1 and 5, 2 and 6, 3 and 7, and 4 and 8 are respectively driven on radio frequency channels having sequence numbers of 1, 2, 3, and 4, and two columns of antennas driven on each radio frequency channel are connected by using one power splitter, wherein a first, second, seventh, and eighth columns of antennas are connected to the phase shifters.

4. The antenna system according to claim 3, wherein an antenna spacing between four antenna groups is 0.5λ, a power split ratio of output of two of the four power splitters is 3:7, and a power split ratio of output of the other two power splitters is 1:4.

5. The antenna system according to claim 1, wherein the antenna is a dual-polarized antenna, and the dual-polarized antenna comprises an antenna element polarized at +45 degrees and an antenna element polarized at −45 degrees.

6. A signal processing method, comprising:
splitting power for each column of M columns of antennas based on a target beam when a N radio frequency channels send radio frequency signals to the M columns of antennas, wherein any of the N radio frequency channels is configured to send a radio frequency signal to drive one or two columns of the M columns of antennas, the M columns of antennas being configured to receive radio frequency signals from the N radio frequency channels and form the target beam, and only one column of two columns of antennas driven on a same radio frequency channel are connected to one of M−N phase shifters and is also connected to one of M−N power splitters, and any of the M−N power splitters is configured to split power for the two columns of antennas connected to the radio frequency channel; and
adjusting, based on the target beam, a phase of a radio frequency signal received by each column of the M columns of antennas, so that the M columns of antennas form the target beam, wherein any of the M−N phase shifters is configured to adjust the phase of the radio frequency signal received by an antenna connected to the phase shifter.

7. The signal processing method according to claim 6, wherein the phase shifter is a 1-bit phase shifter, and the 1-bit phase shifter is configured to adjust the phase of the radio frequency signal received by the antenna connected to the phase shifter to 0 degrees or 180 degrees.

8. The signal processing method according to claim 6, wherein the antenna is a dual-polarized antenna, and the dual-polarized antenna comprises an antenna element polarized at +45 degrees and an antenna element polarized at −45 degrees.

* * * * *

UNITED STATES PATENT AND TRADEMARK OFFICE
CERTIFICATE OF CORRECTION

PATENT NO. : 11,005,546 B2
APPLICATION NO. : 16/584500
DATED : May 11, 2021
INVENTOR(S) : Qingming Xie, Jianping Zhao and Yang Geng Page 1 of 1

It is certified that error appears in the above-identified patent and that said Letters Patent is hereby corrected as shown below:

In the Claims

In Claim 1, Column 14, Line 7, "MN" should be --M–N--.

In Claim 1, Column 14, Line 8, "MN" should be --M–N--.

Signed and Sealed this
Fourteenth Day of December, 2021

Drew Hirshfeld
*Performing the Functions and Duties of the*
*Under Secretary of Commerce for Intellectual Property and*
*Director of the United States Patent and Trademark Office*